(12) United States Patent
Lei et al.

(10) Patent No.: US 9,411,999 B2
(45) Date of Patent: Aug. 9, 2016

(54) BARCODE READER HAVING MULTIPLE SETS OF IMAGING OPTICS

(71) Applicant: The Code Corporation, Draper, UT (US)

(72) Inventors: Ming Lei, Princeton Junction, NJ (US); George Powell, Draper, UT (US)

(73) Assignee: The Code Corporation, Draper, UT (US)

( * ) Notice: Subject to any disclaimer, the term of this patent is extended or adjusted under 35 U.S.C. 154(b) by 211 days.

(21) Appl. No.: 14/221,242

(22) Filed: Mar. 20, 2014

(65) Prior Publication Data

US 2015/0269403 A1  Sep. 24, 2015

(51) Int. Cl.
*G06K 7/10* (2006.01)

(52) U.S. Cl.
CPC ........ *G06K 7/10831* (2013.01); *G06K 7/10792* (2013.01)

(58) Field of Classification Search
USPC .................................................... 235/462.24
See application file for complete search history.

(56) References Cited

U.S. PATENT DOCUMENTS

| | | | | |
|---|---|---|---|---|
| 8,567,678 B2* | 10/2013 | Ohara | ................. | G02B 7/021 235/454 |
| 2003/0222147 A1* | 12/2003 | Havens | ............. | G06K 7/10574 235/462.45 |
| 2006/0032919 A1* | 2/2006 | Shearin | ............. | G06K 7/10683 235/454 |
| 2012/0074227 A1* | 3/2012 | Ferren | ................ | G02B 13/0065 235/462.21 |
| 2013/0087618 A1* | 4/2013 | Zhu | ..................... | G07G 1/0081 235/462.01 |
| 2014/0183264 A1* | 7/2014 | Nunnink | ............ | G06K 7/10811 235/462.24 |

* cited by examiner

*Primary Examiner* — Michael G Lee
*Assistant Examiner* — David Tardif
(74) *Attorney, Agent, or Firm* — Timothy P. O'Hagan; Austin Rapp & Hardman (57) ABSTRACT

The present disclosure provides a barcode reader including a second set of imaging optics having a larger effective depth of field than a first set of imaging optics and requiring a larger amount of time to process a resulting image of a barcode into a decodable format. The barcode reader also includes a processor providing a decoded output based on an image acquired with the second set of imaging optics if an image acquired with the first set of imaging optics is not decodable.

20 Claims, 4 Drawing Sheets

BARCODE READER HAVING MULTIPLE SETS OF IMAGING OPTICS

TECHNICAL FIELD

The present disclosure relates generally to barcode readers. More specifically, the present disclosure relates to a barcode reader having multiple sets of imaging optics, each utilizing a different effective depth of field which may result from use of differing technologies to focus an image of a barcode onto a photo sensor.

BACKGROUND

Barcode readers have a limited distance range over which an image of a barcode is sufficiently sharp (i.e. sufficiently in focus) and imaged, in focus, onto a sufficient quantity of photo sensor pixels (i.e. sufficient resolution) to be decoded. This is often referred to as the depth of field of the barcode reader and, because sufficient focus and resolution are partly a function of the overall size and the module size of the 1D or 2D barcode being imaged, depth of field is often defined in terms of a depth of field for a particular barcode type and module size. Barcodes outside the applicable depth of field (i.e. either too close to the reader or too far from the reader) may not be decodable due to: i) the barcode image not being sufficiently in focus if the barcode is too close or too far from the reader; ii) although in focus, only a portion of the barcode being imaged onto the sensor array if the barcode is too close to the reader; or iii) the image, although in focus, not having sufficient resolution on the sensor array if the barcode is too far from the reader.

SUMMARY

It is possible to increase the distance range over which a barcode reader can capture a decodable image of a barcode by using optics with a larger depth of field. Optics with a larger depth of field, however, typically i) have insufficient illumination or contrast for accurate detection of light/dark transitions which could result from use of a smaller aperture to increase depth of field; and/or ii) rely on intensive image processing or repositioning of the focal plane, each of which requires more time and/or processing resources than simple optics with the more limited depth of field.

The present disclosure provides a barcode reader including a first and second imaging system. The first imaging system may utilize a first optic technology, including first imaging optics and first executable code for obtaining decoded data from a barcode imaged onto a first portion of an image sensor (or a first image sensor). An image sensor may alternatively be referred to as a photo sensor array.

The second imaging system may utilize a second optic technology, including second imaging optics and second executable code for obtaining decoded data from a barcode imaged onto a second portion of the image sensor (or a second image sensor).

As an example, the first set of imaging optics may be a simple fixed spherical lens system while the second set of imaging optics may comprise any of a wavefront coding imaging system, a mechanical adjustable focus lens system, or a liquid lens adjustable focus system.

More specifically, in a first aspect, a barcode reader may comprise: i) at least one image sensor configured to capture an image of a barcode; ii) a first set of imaging optics having a first effective depth of field that produces a first image of the barcode on the at least one image sensor, the first image requiring a first amount of time to process into first decoder ready image data; and iii) a second set of imaging optics having a second effective depth of field that produces a second image of the barcode on the at least one image sensor, the second image requiring a second amount of time to process into second decoder ready image data. The second effective depth of field may be greater than the first effective depth of field and the second amount of time may be greater than the first amount of time.

The barcode reader may further comprise a processor configured to: i) process the first image into the first decoder ready image data; ii) process the second image into the second decoder ready image data; iii) provide a decoded output based on the first decoder ready image data if the first image of the barcode therein is decodable; and iv) provide the decoded output based on the second decoder ready image data if the first image of the barcode in the first decoder ready image data is not decodable. Further, the processor may process the second image into the second decoder ready image data only if the first image of the barcode within the first decoder ready image data is not decodable.

In one aspect, the second set of imaging optics may include a wavefront coding optic configured to cause a path length of the second set of imaging optics to vary spatially, for example along a plane transverse to an optical axis of the second set of imaging optics.

In this aspect, processing the second image into the second decoder ready image data may comprise removing an imaging effect induced by the wavefront coding optic, for example by applying a filter to the second image to remove the imaging effect or deconvolving the second image to remove the imaging effect.

In another aspect, the second set of imaging optics may include an adjustable lens having an object plane that is adjustable along an optical axis of the second set of imaging optics. In this aspect, processing the second image into the second decoder ready image data may comprise varying a position of the object plane along the optical axis of the second set of imaging optics until a barcode image within the second decoder ready image data is decodable.

In one aspect the adjustable lens may include a liquid lens. In another aspect the adjustable lens may include an actuator configured to mechanically adjust the distance between a lens of the second set of imaging optics and the at least one image sensor along the optical axis of the second set of imaging optics.

Yet another aspect of the invention comprises a method of operating a barcode reader. The method may comprise i) capturing a first image of a barcode on at least one image sensor using a first set of imaging optics having a first effective depth of field to produce the first image of the barcode on the at least one image sensor, the first image requiring a first amount of time to process into first decoder ready image data; ii) capturing a second image of the barcode on the at least one image sensor using a second set of imaging optics having a second effective depth of field to produce the second image of the barcode on the at least one image sensor, the second image requiring a second amount of time to process into second decoder ready image data, wherein the second effective depth of field is greater than the first effective depth of field and the second amount of time is greater than the first amount of time.

The method may further comprise using a processor executing code stored on a non transient computer readable media to: i) process the first image into the first decoder ready image data; ii) process the second image into the second decoder ready image data; iii) provide a decoded output based on the first decoder ready image data if the first image of the barcode therein is decodable; and iv) provide the decoded output based on the second decoder ready image data if the first image of the barcode in the first decoder ready image is not decodable. The processor may process the second image into the second decoder ready image data only if the first image of the barcode within the first decoder ready image data is not decodable.

In one aspect of this method, the second set of imaging optics may include a wavefront coding optic configured to cause a path length of the second set of imaging optics to vary spatially, and processing the second image into the second decoder ready image data may comprise removing an imaging effect induced by the wavefront coding optic by applying a filter to the second image to remove the imaging effect or deconvolving the second image to remove the imaging effect.

In another aspect of this method, the second set of imaging optics may include an adjustable lens having an object plane that is adjustable along an optical axis of the second set of imaging optics, and processing the second image into the second decoder ready image data may comprise varying a position of the object plane along the optical axis of the second set of imaging optics until a barcode image within the second decoder ready image data is decodable.

The adjustable lens may be a liquid lens, and varying a position of the object plane along the optical axis of the second set of imaging optics until a barcode image within the second decoder ready image data is decodable may comprise adjusting a prescription curvature of the liquid lens.

The adjustable lens may include an actuator configured to mechanically adjust the distance between a lens of the second set of imaging optics and the at least one image sensor along the optical axis of the second set of imaging optics, and varying a position of the object plane along the optical axis of the second set of imaging optics until a barcode image within the second decoder ready image data is decodable may comprise adjusting distance between the adjustable lens and the at least one image sensor.

Another aspect of this invention may include a barcode reader comprising: i) at least one image sensor configured to capture an image of a barcode; ii) a first set of imaging optics which produces a first image of the barcode on the at least one image sensor, the first image requiring a first amount of time to process into first decoder ready image data; iii) a second set of imaging optics that produces a second image of the barcode on the at least one image sensor, the second image requiring a second amount of time to process into second decoder ready image data, wherein the second amount of time is greater than the first amount of time; and iv) a processor.

The processor may be configured to provide a decoded output based on the first decoder ready image data if the first image of the barcode therein is decodable. If the first decoder ready image data is not decodable, the processor may: i) provide a signal indicative of use of a second imaging system comprising the second set of imaging optics; ii) process the second image into second decoder ready image data; and iii) provide the decoded output based on the second decoder ready image data.

The processor may further provide a good read signal, distinct from the signal indicative of use of the second imaging system, upon decoding of the first decoder ready image data if the first decoder ready image data is decodable.

The processor may further yet provide the good read signal after providing the signal indicative of use of the second imaging system upon decoding of the second decoder ready image data.

The good read signal may be an audio signal of a first frequency tone and the signal indicative of use of the second imaging system may be an audio signal of a second frequency tone distinct from the first frequency tone. The signal indicative of use of the second imaging system may remain active until the earlier of: i) producing decoded data from the second decoder ready image data and providing the good read signal; or ii) determining that the second decoder ready image data is not decodable.

A number of features are described herein with respect to embodiments of the disclosure; it will be appreciated that features described with respect to a given embodiment also may be employed in connection with other embodiments.

The disclosure includes the features described herein, including the description, the annexed drawings, and, if appended, the claims, which set forth in detail certain illustrative embodiments. These embodiments are indicative, however, of but a few of the various ways in which the principles of the disclosure may be employed.

DETAILED DESCRIPTION

Figure 1:
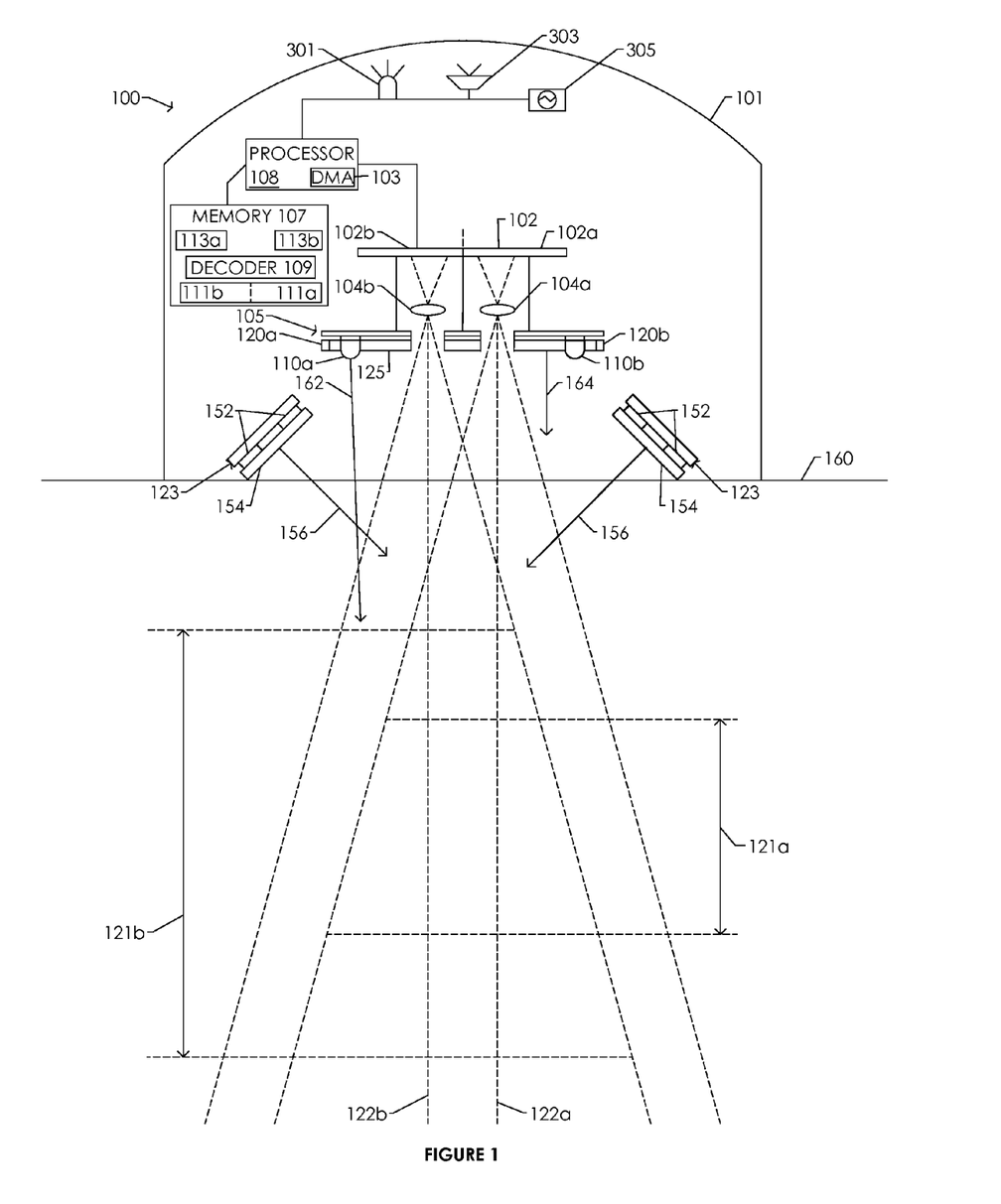
FIG. 1 is a top-down view of a barcode reader in accordance with an exemplary embodiment of the present disclosure.

FIG. 1 is a top-down view of a barcode reader 100 in accordance with the present disclosure. The barcode reader 100 includes a housing 101, an illumination system 105, an image sensor 102 (e.g., a camera), a processor 108, a first set of imaging optics 104a, and a second set of imaging optics 104b. The image sensor 102 is coupled to the processor 108. The processor 108 is coupled to non-transient computer readable media 107 which may include first executable code 113a, second executable code 113b, a decoder 109 (executable code for decoding decoder ready image data), and addressable storage space 111 for storage and processing of image data read from the image sensor 102. The first set of imaging optics 104a and the second set of imaging optics 104b are shown located side-by-side horizontally so that certain illumination components can be depicted in FIG. 1, however this is for convenience only and the two sets of imaging optics can posited vertically.

The barcode reader 100 captures an image of a barcode within its field of view using the image sensor 102 and at least one of the first set of imaging optics 104a and the second set of imaging optics 104b. In the exemplary embodiment a first image is produced by the first set of imaging optics 104a imaging a barcode within the field of view onto a first portion 102a of the image sensor 102 and a second image is produced by the second set of imaging optics 104b imaging the barcode within the field of view onto a second portion 102b of the image sensor 102.

The first image produced using the first set of imaging optics 104a may be processed to decoder ready image data and decoded. One embodiment of processing the first image to decoder reader image data includes the processor 108 executing executable code 113a to store data representing the first image in memory 107 at addressable storage space 111a such that processor 108 may subsequently attempt decode of such stored data by executing the decoder 109.

Another embodiment of processing the first image to decoder reader image data includes a direct memory access controller 103, which may be part of the processor 108, storing data representing the first image in memory 107 at addressable storage space 111*a* such that processor 108 may subsequently attempt decode of such stored data by executing the decoder 109.

Yet another embodiment of processing the first image to decoder reader image data includes both: i) the direct memory access controller 103 storing data representing the first image in memory 107 at addressable storage space 111*a*; and ii) use of the processor 108 executing first executable code 113*a* to process the first image to decoder ready image data. Such processing may include adjusting contrast between greyscale values of pixels based on image processing algorithms intended to enhance the decoder's ability to decode the image. Again, the processor 108 may subsequently attempt decode of such decoder ready image data by executing the decoder 109.

The second image produced using the second set of imaging optics 104*b* may be processed to produce second decoder ready image data. One embodiment of processing the second image to decoder reader image data includes both: i) the direct memory access controller 103 storing data representing the second image in memory 107 at addressable storage space 111*b*; ii) use of the processor 108 executing second executable code 113*b* to process the second image to decoder ready image data; and iii) use of the processor 108 to subsequently attempt to decode such decoder ready image data by executing the decoder 109.

The amount of time that it takes to process the first image into first decoder ready image data may be less than the amount of time that it takes to process the second image into second decoder ready image data. The amount of time that it takes to process the first image to decoder ready image data and i) produce decoded output if the image of the barcode is fully imaged onto the first portion of the image sensor 102*a* with sufficient focus and resolution; or ii) indicate that the image of the barcode is not decodable may be less than the amount of time that it takes to either i) produce decoder ready image data from an image produced by the second set of imaging optics 104*b* on a second portion of the image sensor 102*b*, and either i) obtain decoded data from the decoder ready image data; or ii) indicate that decoder ready image data cannot be decoded. The second set of imaging optics 104*b*, however, has a larger effective depth of field than the first set of imaging optics 104*a* and therefore, in combination with the second executable code 113*b* can be expected to yield decoded data from a barcode that cannot be decoded using the first set of imaging optics 104*a*.

As used herein, "a lesser amount of time to process" (e.g., "a lesser amount of time to process into decoder ready image data") may have various meanings. For example, it may signify that complex computations require a processor 108 executing second executable code 113*b* to perform more calculations and thus take more processing time than simpler computations required for processing the first image to decoder ready image data by executable code 113*a* or DMA controller 103.

As another example, "a lesser amount of time to process" may signify that the combination of time required by DMA controller 103 (or code 113*b*) to store the second image to memory 107 at addressable storage location 111*b*, perform complex computations by the processor 108 executing executable second executable code 113*b* to produce decoder ready image data, and decode the decoder ready image data may be more time than the time required for DMA controller 103 (or code 113*a*) to store the first image to memory 107 at addressable storage location 111*a* as decoder ready image data and decode such decoder ready image data.

As another example, "a lesser amount of time to process" may signify that the processor 108 executing second executable code 113*b* drives mechanical operations, such as repositioning a lens in an autofocusing lens assembly, which would require more processing time than the simpler computations required for processing the first image to decoder ready image data.

As yet another example, "a lesser amount of time to process" may signify that the processor 108 executing second executable code 113*b* drives mechanical operations, such as repositioning a lens in an autofocusing lens assembly, which would require more time to sequentially capture multiple images using the second imaging optics 104*b*, each at a different position, select a position that provides best focus and resolution (or suitable focus and resolution for producing decoder ready image data), store the suitable image as decoder ready image data in memory 107 at addressable storage location 111*b* (using DMA controller 103), and decode the decoder ready image data than the time required for DMA controller 103 (or code 113*a*) to store the first image to memory 107 at addressable storage location 111*a* as decoder ready image data and decode such decoder ready image data.

As yet another example, "a lesser amount of time to process" may signify that the processor 108 executing second executable code 113*b* adjusts a focal plane through a distance range (with or without mechanical repositioning of the lens) requiring more time to obtain decoder ready image data on the second portion of the image sensor 102 than a lens system with a stationary focal plane where little or no focal plane adjustment is performed.

As yet another example, "a lesser amount of time to process" may signify that the processor 108 executing second executable code 113*b* adjusts a focal plane through a distance range (with or without mechanical repositioning of the lens), and that it requires more time to sequentially capture multiple images using the second imaging optics 104*b*, each at a different focal plane position, select a position that provides best focus and resolution (or suitable focus and resolution for producing decoder ready image data), store the suitable image as decoder ready image data in memory 107 at addressable storage location 111*b* (using DMA controller 103), and decode the decoder ready image data than the time required for DMA controller 103 (or code 113*a*) to store the first image to memory 107 at addressable storage location 111*a* as decoder ready image data and decode such decoder ready image data.

As will be understood by one of ordinary skill in the art, this disclosure is not limited to these examples of "a lesser amount of time to process".

As shown in FIG. 1, the image sensor 102 may be located near a center of the housing 101 between the first set of imaging optics 104*a* and the second set of imaging optics 104*b*.

The first set of imaging optics 104*a* may be located within the housing 101 and focus light onto the image sensor 102. The first set of imaging optics 104*a* may focus light onto an entirety of the image sensor 102 or a first portion 102*a* of the image sensor 102. The first portion 102*a* of the image sensor 102 may correspond to approximately a first half of the image sensor 102 or some other percentage of the image sensor 102 (e.g., one quarter of the image sensor 102).

The second set of imaging optics 104b may also be located within the housing 101 and focus light onto the image sensor 102. The second set of imaging optics 104b may focus light onto an entirety of the image sensor 102 or a second portion 102b of the image sensor 102. The second portion 102b of the image sensor 102 may correspond to approximately a second half of the image sensor 102, different from the first half of the image sensor 102 that the first set of imaging optics 104a focuses light onto. For example, the first set of imaging optics 104a may focus light onto approximately the first half of the image sensor 102. At the same time, the second set of imaging optics 104b may focus light onto approximately the second half of the image sensor 102.

In an alternative embodiment, the image sensor 102 may comprise a first image sensor 102a and a second image sensor 102b, the first image sensor 102a including the first portion 102a of the image sensor 102 and the second image sensor 102b including the second portion 102b of the image sensor 102. The first set of imaging optics 104a may focus light onto the first image sensor 102a and the second set of imaging optics 104b may focus light unto the second image sensor 102b.

As will be understood by one of ordinary skill in the art, the image sensor 102 may comprise any device capable of capturing an image of a field of view. For example, the image sensor 102 may comprise any detector comprising a pixel array and capable of measuring or quantifying light incident on the pixel array of the detector. The detector may comprise, for example, a CCD sensor, CMOS sensor, or any device capable of measuring or quantifying light incident on the pixel array of the detector.

Turning again to FIG. 1, the first set of imaging optics 104a has a first effective depth of field 121a that produces a first image of the barcode on the first portion 102a of the image sensor 102 which, when processed by the processor 108 executing the first executable code 113a (or DMA controller 103) requires a first amount of time to either: i) produce decoded output if the image of the barcode is fully imaged onto the first portion 102a of the image sensor 102 with sufficient focus and resolution; or ii) indicate that the barcode is not decodable.

The second set of imaging optics 104b has a second effective depth of field 121b that produces a second image of the barcode on the second portion 102b of the image sensor 102 which, when processed by the processor 108 executing the second executable code 113b (or DMA controller 103 in combination with second executable code 113b) requires a second amount of time to either: i) produce decoder ready image data from an image produced by the second set of imaging optics 104b, and obtain decoded data from the decoder ready image data; or ii) indicate that a decodable image of the barcode cannot be produced.

The second effective depth of field 121b is greater than the first effective depth of field 121a and the second amount of time is greater than the first amount of time. Thus, it takes, e.g., a longer amount of time and/or more processing resources to generate decoded data utilizing the image formed by second imaging system than the image formed by the first imaging system. As used herein, the phrase "first imaging system" refers to the components within the reader 100 that produce the first image, such as the first set of imaging optics 104a and the first portion 102a of the image sensor 102. The phrase "second imaging system" refers to the components within the reader 100 that produce the second image, such as the second set of imaging optics 104b and the second portion 102b of the image sensor 102.

In the embodiment depicted in FIG. 1, the first set of imaging optics 104a includes a single lens or spherical lens system having a first effective depth of field 121a. In this embodiment, the first set of imaging optics 104a is stationary, resulting in the first set of imaging optics 104a focusing light from the target area onto the image sensor 102 with sufficient focus and resolution for decoding a defined barcode when such barcode is within the first effective depth of field 121a.

Processing the first image into the first decoder ready image data may comprise receiving the output from the image sensor 102 (using the DMA controller 103 or first executable code 113a) corresponding to the first image and storing this information at addressable space 111a in memory 107 in a form where it is possible for the processor 108, executing the decoder 109 to determine if the image is decodable in accordance with the predefined criteria and/or either: i) decode the image of the barcode to produce decoded output; or ii) indicate that the image of the barcode is not decodable.

Figure 2A:
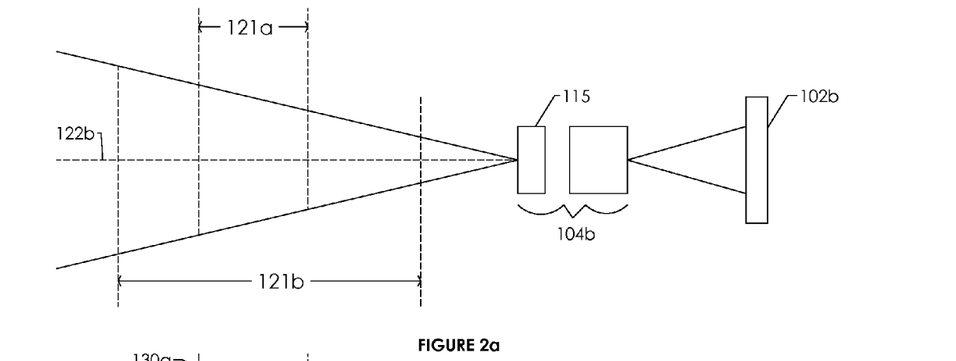
FIGS. 2A to 2C are views of a second set of illumination optics with an effective depth of field greater than a first set of illumination optics in accordance with an exemplary embodiment of the present invention.

With further reference to FIG. 1 in conjunction with FIG. 2A, the second set of imaging optics 104b may utilize wavefront coding technology. Wavefront coding utilizes spatial variation across the image plane such that an image of the field of view is convoluted. Processing of the convoluted image to recover an image of the field of view results in the recovered image being sharper over a depth of field 121b that is larger than the depth of field 121a of a traditional fixed spherical optic system.

As such, in this embodiment, the second set of imaging optics 104b includes a wavefront coding optic, such as a phase mask 115 configured to cause spatial variation of a path length of the second set of imaging optics 104b. The phase mask 115 may be a linear phase mask or a cubic facemask to induce spatial variation along a plane transverse to an optical axis 122b of the second set of imaging optics 104b.

The second executable code 113b, when operated by the processor 108, may process the second image into the second decoder ready image data by removing the imaging effects induced by the wavefront coding optic. The imaging effects may be removed by applying a digital filter to the second image or deconvolving the second image. As will be understood by one of ordinary skill in the art, any suitable technique may be used to remove the imaging effects induced by the wavefront coding optic and to generate decoder ready image data. Generating decoder ready image data may include applying the foregoing image processing techniques to generate an image of the barcode with sufficient sharpness and resolution for decoding when the barcode is within the second effective depth of field 121b.

Figure 2B:
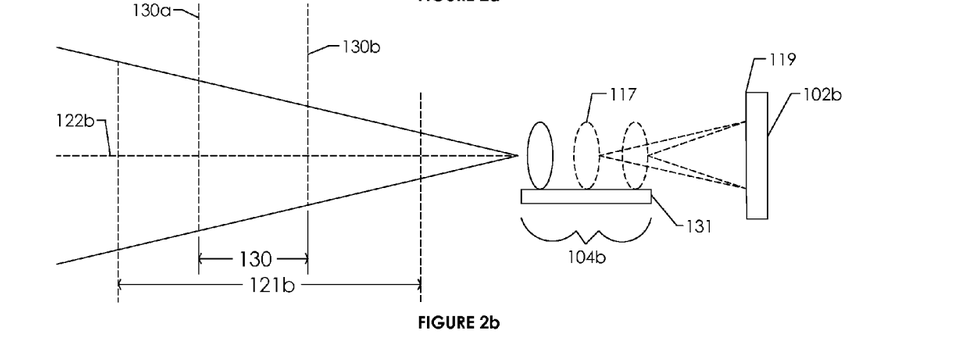

Turning to FIG. 1 in conjunction with FIG. 2B, the second set of imaging optics 104b may include an adjustable lens 117 which moves an object plane 130 (i.e. a distance in front of the imaging optics 104b which is focused by the imaging optics 104b onto a focal plane 119 that corresponds to the plane of the image sensor 102). The object plane 130 is adjustable along an optical axis 122b of the second set of imaging optics 104b such that the second effective depth of field 121b comprises the range of distances through which the object plane 130 may be adjusted plus a variance in which the second image, although not perfectly focused onto the image sensor 102b, is focused with sufficient sharpness and resolution for decoding.

In this embodiment, processing the second image into the second decoder ready image data may include adjusting the lens 117 to move or control the position of the object plane 130 along the optical axis 122b of the second set of imaging optics 104b until the image of the barcode within the field of view has sufficient sharpness and resolution for decoding and/or meets other predefined criteria.

It should be appreciated that when the lens 117 is positioned at any particular position, for example, the position such that the object plane 130 is at position 130b, the actual depth of field of the second set of imaging optics 104b may be less than the effective depth of field 121b which results from aggregating the range of distances that are within the actual depth of field of the imaging optics 104b at any of the lens positions.

For example, the object plane 130 of the second set of imaging optics 104b is located at the first position 130b when the lens 117 is in a first position and the object plane 130 of the second set of imaging optics 104b is located at the second position 130a when the lens 117 is in a second position. In each case the actual depth of field of the second set of imaging optics 104b is located along the optical axis 122b of the second set of imaging optics 104b at a position which includes the applicable object plane position 130a, 130b— but the actual depth of field of the second set of imaging optics 104b when the lens 117 is positioned for object plane position 130b is farther from the reader 100. The effective depth of field extends from the close edge of the actual depth of field when the lens 117 is adjusted for object plane position 130b to the far edge of the actual depth of field when the lens 117 is adjusted for object plane position 130a.

Figure 2C:
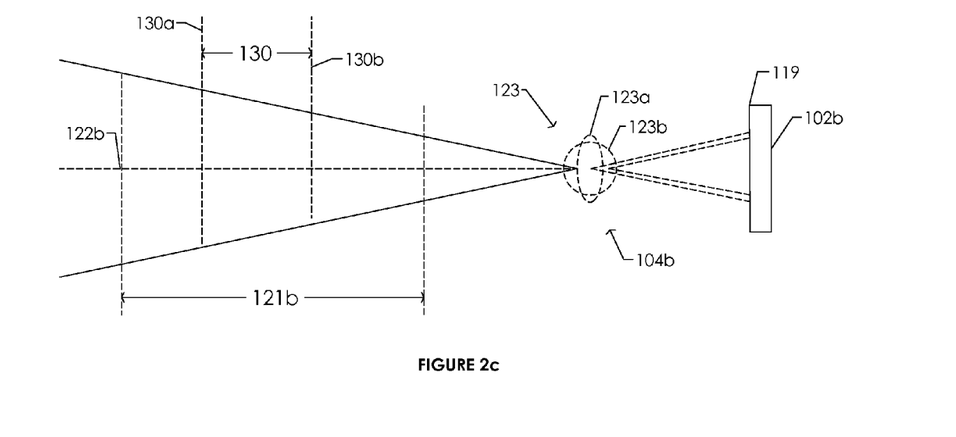

Turning to FIG. 1 in conjunction with FIG. 2C, the second set of imaging optics 104b may include an adjustable lens 123, such as a liquid lens, which moves an object plane 130 (i.e. a distance in front of the imaging optics 104b which is focused by the imaging optics 104b onto a focal plane 119 that corresponds to the plane of the image sensor 102) by changing the curvature, or prescription, of the adjustable lens 123. The object plane 130 is adjustable along an optical axis 122b of the second set of imaging optics 104b such that the second effective depth of field 121b comprises the range of distances through which the object plane 130 may be adjusted plus a variance in which the second image, although not perfectly focused onto the image sensor 102b, is focused with sufficient sharpness and resolution for decoding.

In this embodiment, processing the second image into the second decoder ready image data may include adjusting the lens 123 to move or control the curvature between a low prescription curvature 123a and a higher prescription curvature 123b such that the position of the object plane 130 along the optical axis 122b of the second set of imaging optics 104b is adjusted until the image of the barcode within the field of view has sufficient sharpness and resolution for decoding and/or meets other predefined criteria.

Again, it should be appreciated that when the lens 123 is positioned at any particular position, for example, the position such that the object plane 130 is at position 130b, the actual depth of field of the second set of imaging optics 104b may be less than the effective depth of field 121b which results from aggregating the range of distances that are within the actual depth of field of the imaging optics 104b at any of the lens positions.

For example, the object plane 130 of the second set of imaging optics 104b is located at the first position 130b when the lens 123 is of a first curvature prescription and the object plane 130 of the second set of imaging optics 104b is located at the second position 130a when the lens 123b is at a second curvature prescription.

To contrast with wavefront coding, the wavefront coding optic, with deconvolving processing, has an actual depth of field (and an effective depth of field) larger than the actual depth of field of the first set of imaging optics 104a. However, with an adjustable lens, the second set of imaging optics 104b has an actual depth of field that is less than or equal to the actual depth of field of the first set of imaging optics 104a, but an effective depth of field 121b that is greater than the effective depth of field 121a of the first set of imaging optics 104a.

In embodiments where the second set of imaging optics 104b includes an adjustable lens, the adjustable lens may be an electronically controllable lens (such as a liquid lens) or a mechanically controllable lens. The mechanically controllable lens may include an actuator 131 configured to mechanically adjust the distance between the lens and the image sensor 102 such that when the focal plane 119 is defined by the plane of the image sensor 102, the position of the object plane 130 varies along the optical axis 122b of the second set of imaging optics 104b within the second effective depth of field 121b.

The liquid lens may include an actuator configured to adjust the prescription or shape of the lens such that when the focal plane 119 is defined by the plane of the image sensor 102, the position of the object plane 130 varies along the optical axis 122b of the second set of imaging optics 104b within the second effective depth of field 121b.

As will be understood by one of ordinary skill in the art, the adjustable lens is not limited to a liquid lens or a mechanical lens, but may comprise any lens system which permits adjustment of the object plane and/or the range of distances over which a defined barcode can be focused onto the image sensor 102 with sufficient sharpness and resolution for decoding.

Further, the first set of imaging optics 104a is not limited to a traditional spherical lens system with stationary object and focal planes. That is, the first set of imaging optics 104a may include an adjustable lens having an object plane that is adjustable along the optical axis 122a of the first set of imaging optics 104a within the first effective depth of field 121a. In this embodiment, processing, using the first executable code 113a, the first image into the first decoder ready image data may include controlling a position of the object plane along the optical axis 122a of the first set of imaging optics 104a until the first decoder ready image data of the barcode is decodable in accordance with the predefined criteria.

As will be understood by one of ordinary skill in the art, the first and second set of imaging optics 104a, 104b may comprise a single lens, a series of lenses, a combination of optical components, or any other suitable structure for focusing illumination from the target area onto an image sensor 102.

The processor 108 may receive an output from the image sensor 102 representing the light incident upon the image sensor 102. For example, the processor 108 may receive from the image sensor 102 an output representing the first image produced using the first set of imaging optics 104a. The processor 108 may also receive from the image sensor 102 an output representing the second image produced using the second set of imaging optics 104b. The processor 108 may instead receive a single output from the image sensor 102 including both the first image and the second image or separate outputs for the first and second image. In all of these embodiments receiving the output from the image sensor 102 may include a direct memory access controller 103 placing the output of the image sensor 102 into memory 107 and the processor 108 obtaining the image, or portions thereof, from the memory 107.

If the first decoder ready image data is not decodable in accordance with the predefined criteria, the processor 108 is configured to provide a decoded output based on the second decoder ready image data. Two embodiments depicting operation of the barcode reader 100 are shown in FIGS. 3A and 3B.

Figure 3A:
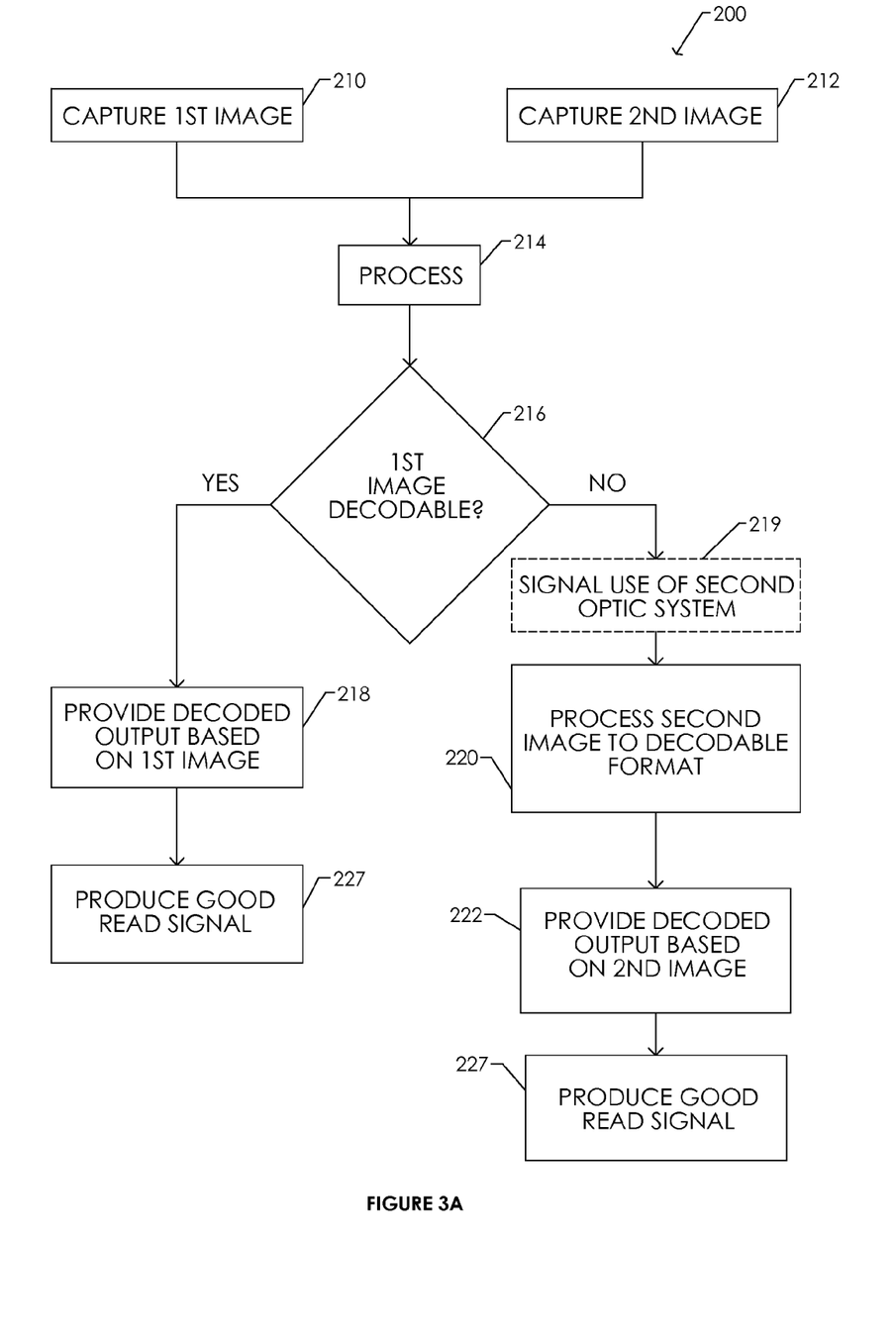
FIGS. 3A and 3B flow diagrams depicting operation of the barcode reader in accordance with an exemplary embodiment of the present invention.
Figure 3B:
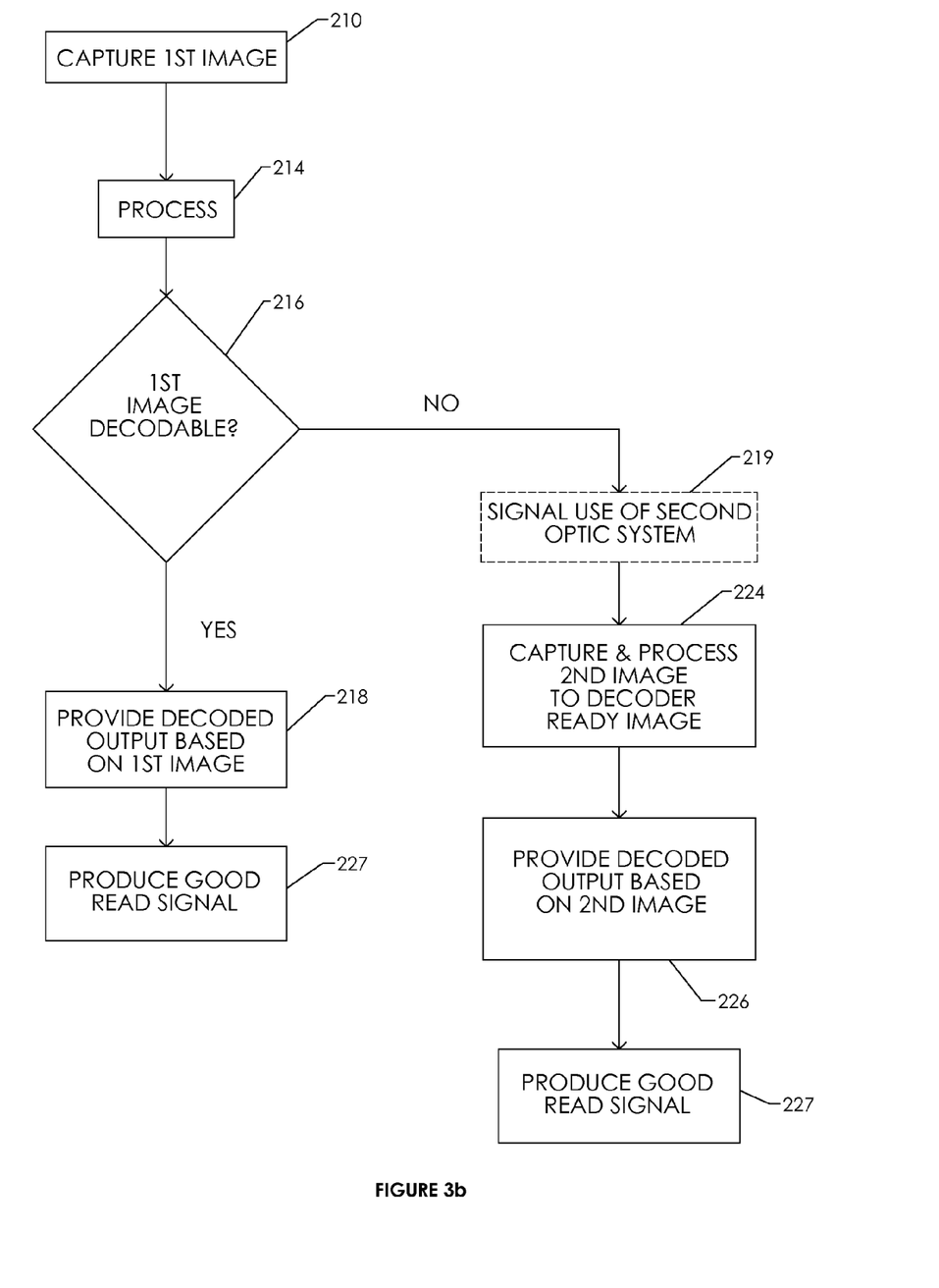

Turning first to the embodiment in FIG. 3A, the processor 108 may be configured to operate the second executable code 113b to process the second image into the second decoder ready image data only if the first decoder ready image data does not include a decodable barcode. As outlined in FIG. 3A, after the image sensor 102 captures a first image in step 210 and a second image in step 212 (which may be simultaneous capture of the first image and the second image by image sensor 102), the processor 108 (or DMA controller 103) may process the first image into the first decoder ready image data at addressable location 111a within memory 107 and process the second image into addressable location 111b within memory 107 at step 214. If the first decoder ready image data at addressable location 111a is decodable in step 216, the processor 108 may provide the decoded output based on the first decoder ready image data in step 218 without further processing the second image into second decoder ready image data. Then, at step 227 the processor may produce a good read signal.

Returning briefly to FIG. 1, a good read signal may be any permutations of: i) illumination of LED 301 of a certain color to indicate good read; ii) activation of a speaker 303 at a first audio frequency tone to indicate a good read; and/or iii) activation of a vibration motor 305 in a first distinctive activation pattern to indicate a good read.

Returning to FIG. 3A, if a barcode cannot be decoded within the first decoder ready image data at step 216, the processor may further process the second image and attempt decode of the second image. More specifically, the processor 108 may, as an option, signal use of the second imaging system. As discussed, processing of the second image may require more time than that required to process the first image. Such additional time may extend beyond the time the user of the reader 100 would expect to be required for image processing and decode. Therefore, the purpose of the signal to indicate use of the second optic system is to notify the user that additional processing time is required for attempting decode of the barcode within the field of view.

Returning briefly to FIG. 1 again, the signal to indicate use of the second optic system is a signal that is distinct from the good read signal and may be any permutations of: i) illumination of LED 301 of a certain color or illumination pulse pattern, distinct from illumination of LED 301 for a good read signal; ii) activation of a speaker 303 at a second audio frequency tone, distinct from the first audio frequency tone used to indicate a good read; and/or iii) activation of a vibration motor 305 in a second distinctive activation pattern, distinct from the first distinctive activation pattern used to indicate a good read.

Returning to FIG. 3a, the processor 108 may process the second image (already partially processed and stored in memory 107 at step 214) into second decoder ready image data in step 220. After processing the second image into second decoder ready image data, the processor 108 provides a decoded output based on the second decoder ready image data in step 222 and then produces the good read signal (discussed above) at step 227.

Because the purpose of the signal indicating use of the second optic system is intended to help the user remain patient during the extended duration of time required to process the second image, the signal indicating use of the second optic system may remain active during processing and decoding at steps 220 and 222.

As outlined in FIG. 3A, if the first decoder ready image data of the barcode is decodable, then the processor 108 may not attempt to decode the second image and therefore never performs steps 219, 220 or 222. This has the advantage of not using processing resources to process the second image nor attempt to decode the second decoder ready image data until after an attempt has already been made to decode the first decoder ready image data. Waiting to process the second image may be preferable, because the time required to decode the first decoder ready image data is less than the time required to decode the second decoder ready image data.

In an alternative embodiment depicted in FIG. 3B, the processor 108 does not begin processing the second image into the second decoder ready image data until after it is determined that the first image is not decodable.

In this example, the image sensor 102 again captures a first image in step 210 and the processor 108 (or DMA controller 103) processes the first image into a decoder ready format within memory 107 at step 214.

If the first decoder ready image data is decodable in step 216, the processor 108 provides a decoded output based on the first decoder ready image data in step 218 and produces the good read signal at step 227.

If the first decoder ready image data is not decodable in step 216, the processor 108 may: i) generate the signal indicating use of the second imaging system at step 219; and ii) capture and process the second image, including processing the second image to a decoder ready format in memory 107 at step 224, provide a decoded output based on the second decoder ready image data in step 226, and generate the good read signal at step 227.

The embodiment outlined in FIG. 3A may be useful in the embodiment where the second set of imaging optics 104b includes a phase mask and the second image is captured simultaneously with the first image. The embodiment outlined in FIG. 3B may be useful in the embodiment where the object plane 130 of the second set of imaging optics 104b is adjusted and the second image is captured when the object plane 130 has been adjusted to a location at which the second image will depict the barcode with sufficient sharpness and resolution for decoding.

As will be understood by one of ordinary skill in the art, the processor 103 may have various implementations. For example, the processor 103 may include any suitable device, such as a programmable circuit, integrated circuit, memory and I/O circuits, an application specific integrated circuit, microcontroller, complex programmable logic device, other programmable circuits, or the like. The processor 103 may also include, or be coupled to, a non-transitory computer readable medium, such as random access memory (RAM), a read-only memory (ROM), an erasable programmable read-only memory (EPROM or Flash memory), or any other suitable medium. Instructions for performing the steps outlined above may be stored in the non-transitory computer readable medium and executed by the processor 103. The processor 103 may be communicatively coupled to a computer readable medium through a system bus, mother board, or using any other suitable structure known in the art. The processor 103 may, e.g., comprise a multi-core processor, a single processor, and/or multiple processors acting alone or in conjunction with one another.

Returning to FIG. 1, the barcode reader 100 may also include a housing 101 configured to retain the first set of imaging optics 104a, the second set of imaging optics 104b, and the image sensor 102. The first set of imaging optics 104a and the second set of imaging optics 104b may be positioned within the housing 101 such that there is a first optical path through the first set of imaging optics 104a to a first portion 102a of the image sensor 102 and a second optical path through the second set of imaging optics 104b to a second portion 102b of the image sensor 102. As described previously, the first optical path may be different from the second optical path.

As will be understood by one of ordinary skill in the art, the housing 101 may be composed of any suitable material and take any suitable shape. For example, the housing 101 may be composed primarily of plastic, with different portions of the housing 101 composed of metal, rubber, and glass.

The barcode reader 100 may additionally include an illumination system 105 configured to illuminate the barcode while the image sensor 102 captures an image of the barcode. The illumination system 105 includes at least one light source, preferably multiple illumination systems such as a bright field illumination system, a diffuse bright field illumination system, and a dark field illumination system, each of which is optimized for illuminating a portion of the effective depth of field 121b of the second set of imaging optics 104b, and one of the illumination systems being optimized for illuminating the limited depth of field 121a of the first set of imaging optics 104a.

The dark field illumination system may include illumination LEDs 152 and a diffusive substrate 154 in front of the LEDs 152 such that dark field illumination 156 is diffuse and emitted into the field of view at an angle of at least 45 degrees from the optical axis 122.

The diffuse bright field illumination system may include an edge lit optical substrate 125 including one or more extraction features. The optical substrate 125 includes a front major surface that is arranged generally perpendicular to the optical axis 122. Illumination 164 is emitted through the front major surface. Light is introduced from the at least one light source 120a, 120b between the front major surface and a generally parallel back major surface. The introduced light is transferred by total internal reflection through the optical substrate 125 between the front major surface and back major surface in a direction transverse to the optical axis 122. The center of the optical substrate 125 may include an opening or an aperture(s) through which objects (such as a barcode) may be visible to the image sensor 102.

The bright field illumination system may include illumination LEDs 110a, 110b for directing illumination into the field of view. The bright field illumination is optimized for illuminating barcodes at the far distances from the reader 100 and diffusion of the illumination on a target barcode is generally a function of its distance from the reader 100 instead of diffusing optics within the reader 100. Illumination LEDs 110a, 110b are positioned such that illumination 162 is directed to the field of view at a slightly converging angle.

The illumination system 105 is described in further detail in U.S. patent application Ser. No. 14/105,380 titled Barcode Reader having Multiple Illumination Systems and Multiple Sets of Imaging Optics, filed on 13 Dec. 2013 and commonly assigned with the present application. The Ser. No. 14/105,380 application is herein incorporated by reference in its entirety.

The claims are not limited to the specific implementations described above. Various modifications, changes and variations may be made in the arrangement, operation and details of the implementations described herein without departing from the scope of the claims.

What is claimed is:

1. A barcode reader, comprising:
at least one image sensor configured to capture an image of a barcode;
a spherical optic system focusing an un-convoluted image of the barcode on the at least one image sensor;
a wave-front coding optic system having a spatially varied optical path length, producing a convoluted image of the barcode on the at least one image sensor; and
a processor configured to:
attempt decoding of the un-convoluted image of the barcode and generate decoded therefrom if decoding is successful; and
process the convoluted image to generate a recovered image of the barcode and attempt decoding of the recovered image of the barcode if decoding of the un-convoluted image is not successful.

2. The barcode reader of claim 1, wherein the processor begins processing the convoluted image generated by the wave-front coding optic system only after determining that the un-convoluted image generated by the spherical optic system is not decodable.

3. The barcode reader of claim 1, wherein the path length of the wave front coding optic system varies with respect to position along a plane transverse to an optical axis of the second set of imaging optics.

4. The barcode reader of claim 1, wherein the processor further provides a good read signal upon successful decode of the un-convoluted image.

5. The barcode reader of claim 4, wherein the processor further provides a signal indicative of use of the convoluted image, the signal indicative of use of the convoluted image being distinct from the good read signal, if processing of the convoluted image is commenced.

6. The barcode reader of claim 5, wherein the processor further provides a good read signal, distinct from the signal indicative of use of the convoluted image, and after providing the signal indicative of use of the convoluted image, upon decoding of the image of the barcode within the recovered image.

7. The barcode reader of claim 6, where the good read signal is an audio signal of a first frequency tone and the signal indicative of use of the convoluted image is an audio signal of a second frequency tone distinct from the first frequency tone.

8. The barcode reader of claim 7, wherein the signal indicative of use of the convoluted image remains active until the earlier of: i) producing decoded data from the image of the barcode within the recovered image and providing the good read signal; or ii) determining that the image of the barcode within the recovered image is not decodable.

9. A method of operating a barcode reader, the method comprising:
capturing an un-convoluted image of a barcode on at least one image sensor using a spherical optic system;
capturing a convoluted image of the barcode on the at least one image sensor using a wave-front coding optic system having a spatially varied optical path length;
attempting to decode the un-convoluted image of the barcode and generate decoded therefrom if decoding is successful; and
processing the convoluted image to generate a recovered image of the barcode and attempting to decode the recovered image of the barcode if decoding of the un-convoluted image is not successful.

10. The method of operating the barcode reader of claim 9, wherein processing the convoluted image generated by the wave-front coding optic system begins only after determining that the un-convoluted image generated by the spherical optic system is not decodable.

11. The method of claim 9, further comprising providing a good read signal upon successful decode of the un-convoluted image.

12. The method of claim 11, further comprising providing a signal indicative of use of the convoluted image, the signal indicative of use of the convoluted image being distinct from the good read signal, if processing of the convoluted image is commenced.

13. The method of claim 12, further comprising providing a good read signal, distinct from the signal indicative of use of the convoluted image, and after providing the signal indicative of use of the convoluted image, upon decoding of the image of the barcode within the recovered image.

14. The method of claim 13, wherein the good read signal is an audio signal of a first frequency tone and the signal indicative of use of the convoluted image is an audio signal of a second frequency tone distinct from the first frequency tone.

15. The method of claim 14, wherein the signal indicative of use of the convoluted image remains active until the earlier of: i) producing decoded data from the image of the barcode within the recovered image and providing the good read signal; or ii) determining that the image of the barcode within the recovered image is not decodable.

16. A barcode reader, comprising:
  at least one image sensor configured to capture an image of a barcode;
  a spherical optic system focusing an un-convoluted image of the barcode on the at least one image sensor;
  a wave-front coding optic system having a spatially varied optical path length, producing a convoluted image of the barcode on the at least one image sensor; and
  a processor configured to:
    provide a decoded output based on the un-convoluted image if the image of the barcode therein is decodable; and
    if the image of the barcode within the un-convoluted image is not decodable:
      provide a signal indicative of use of the convoluted image generated by the wave-front coding optic system;
      process the convoluted image to generate a recovered image of the barcode; and
      provide the decoded output based on an image of the barcode within the recovered image.

17. The barcode reader of claim 16, wherein the processor further:
  provides a good read signal, distinct from the signal indicative of use of the convoluted image upon successful decode of the un-convoluted image.

18. The barcode reader of claim 17, wherein the processor further:
  provides a good read signal, distinct from the signal indicative of use of the convoluted image, and after providing the signal indicative of use of the convoluted image, upon decoding of the image of the barcode within the recovered image.

19. The barcode reader of claim 18, where the good read signal is an audio signal of a first frequency tone and the signal indicative of use of the convoluted image is an audio signal of a second frequency tone distinct from the first frequency tone.

20. The barcode reader of claim 18, wherein the signal indicative of use of the convoluted image remains active until the earlier of: i) producing decoded data from the image of the barcode within the recovered image and providing the good read signal; or ii) determining that the image of the barcode within the recovered image is not decodable.

* * * * *